United States Patent
Hinkleman

Patent Number: 5,927,656
Date of Patent: *Jul. 27, 1999

[54] WING LEADING EDGE FLAP AND METHOD THEREFOR

[75] Inventor: Michael J. Hinkleman, Kent, Wash.

[73] Assignee: The Boeing Company, Seattle, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/673,675

[22] Filed: Jun. 26, 1996

[51] Int. Cl.[6] ............................... B64C 3/44; B64C 9/22; B64C 13/16

[52] U.S. Cl. ..................... 244/203; 244/214; 244/219; 244/76 A; 244/76 B

[58] Field of Search ..................... 244/210, 213, 244/214, 219, 194, 195, 76 A, 76 B, 203

[56] References Cited

U.S. PATENT DOCUMENTS

| | | |
|---|---|---|
| 2,167,601 | 7/1939 | Rose . |
| 3,375,998 | 4/1968 | Calderon .................. 244/210 |
| 4,159,089 | 6/1979 | Cole ........................ 244/214 |
| 4,189,120 | 2/1980 | Wang ....................... 244/214 |
| 4,285,482 | 8/1981 | Lewis ...................... 244/214 |
| 4,293,110 | 10/1981 | Middleton et al. ......... 244/214 X |
| 4,360,176 | 11/1982 | Brown ...................... 244/214 |
| 4,585,192 | 4/1986 | Clifford-Jones .......... 244/214 |
| 4,640,477 | 2/1987 | Pace ........................ 244/214 |
| 4,650,140 | 3/1987 | Cole . |
| 4,687,162 | 8/1987 | Johnson et al. ........... 244/213 |
| 4,741,503 | 5/1988 | Anderson et al. ......... 244/219 X |
| 4,753,402 | 6/1988 | Cole ........................ 244/214 X |
| 4,880,189 | 11/1989 | Day ......................... 244/214 |
| 4,899,284 | 2/1990 | Lewis et al. .............. 244/219 X |
| 4,915,327 | 4/1990 | Ellmers et al. ........... 244/214 X |
| 5,056,741 | 10/1991 | Bliesner et al. .......... 244/214 |
| 5,158,252 | 10/1992 | Sakurai .................... 244/214 |
| 5,544,847 | 8/1996 | Bliesner . |

FOREIGN PATENT DOCUMENTS

| | | | |
|---|---|---|---|
| 58868 | 12/1948 | France | ............ 244/214 |

*Primary Examiner*—William Grant
*Attorney, Agent, or Firm*—Robert H. Sproule

[57] ABSTRACT

A leading edge flap system for an airplane includes a flap which is rotated about a single hinge point between (i) a retracted position, (ii) an intermediate extended position for high speed maneuvering, and (iii) a fully extended position for low speed maneuvering. In the high speed intermediate position, there is no slot between the flap and the wing leading edge. This position provides additional lift to improve the airplane's turning performance. On the other hand, in the low speed fully extended position, the flap is rotated a greater amount than in the intermediate extended position. In this position there is a slot between the flap and the fixed leading edge to permit air to flow from the bottom of the flap upward and over the upper surface of the leading edge. This improves the lateral stability of the airplane when in a sideslip during stall conditions.

9 Claims, 4 Drawing Sheets

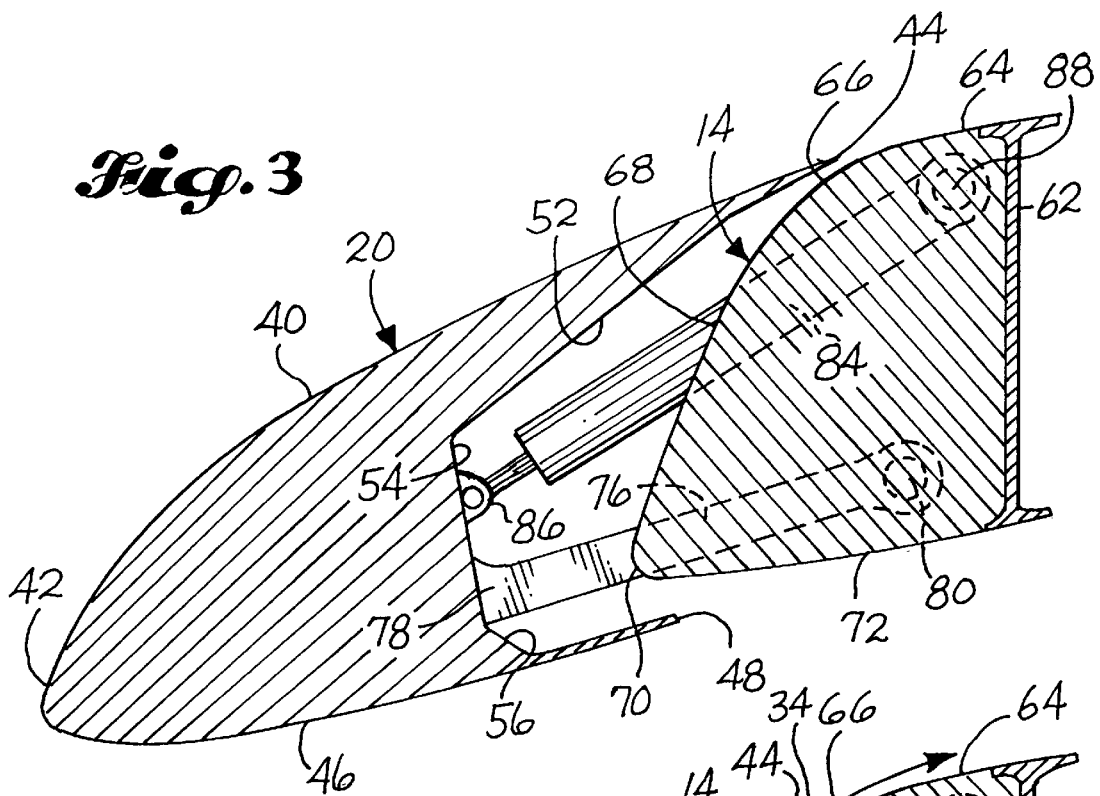
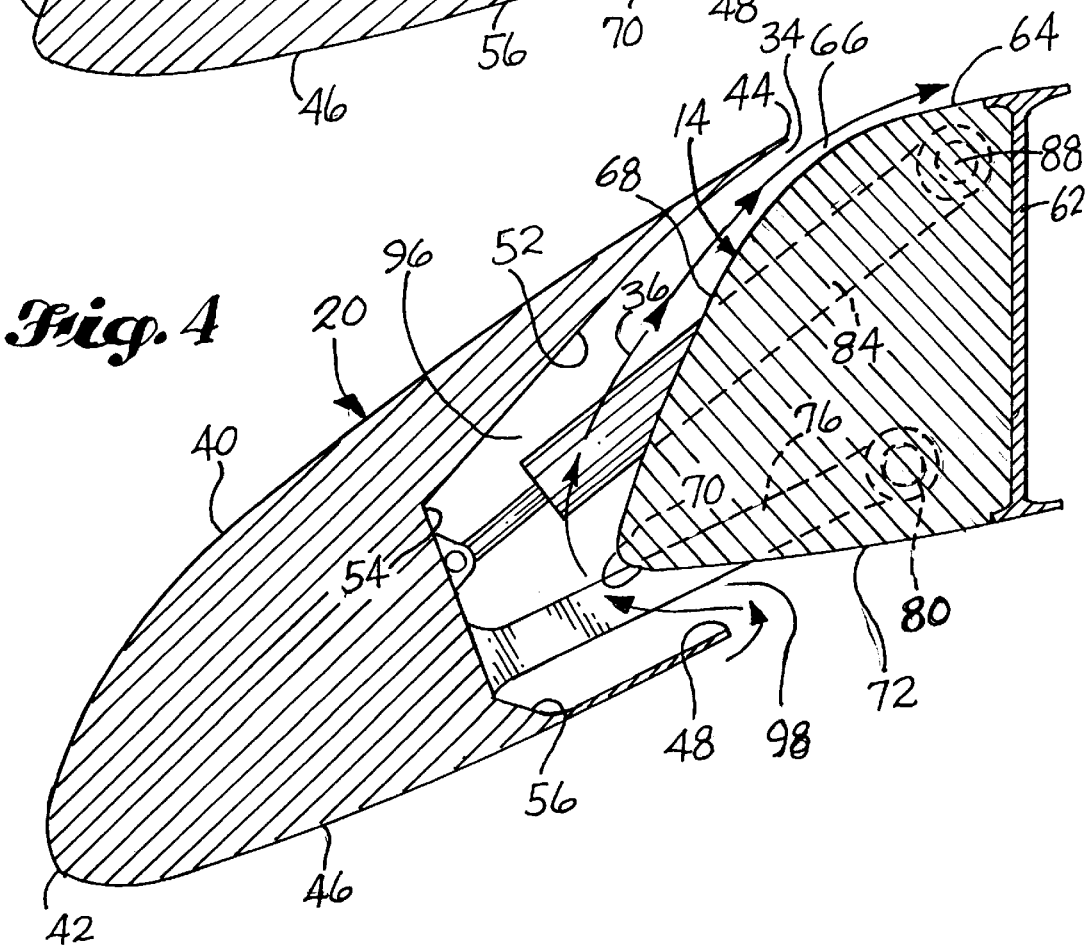

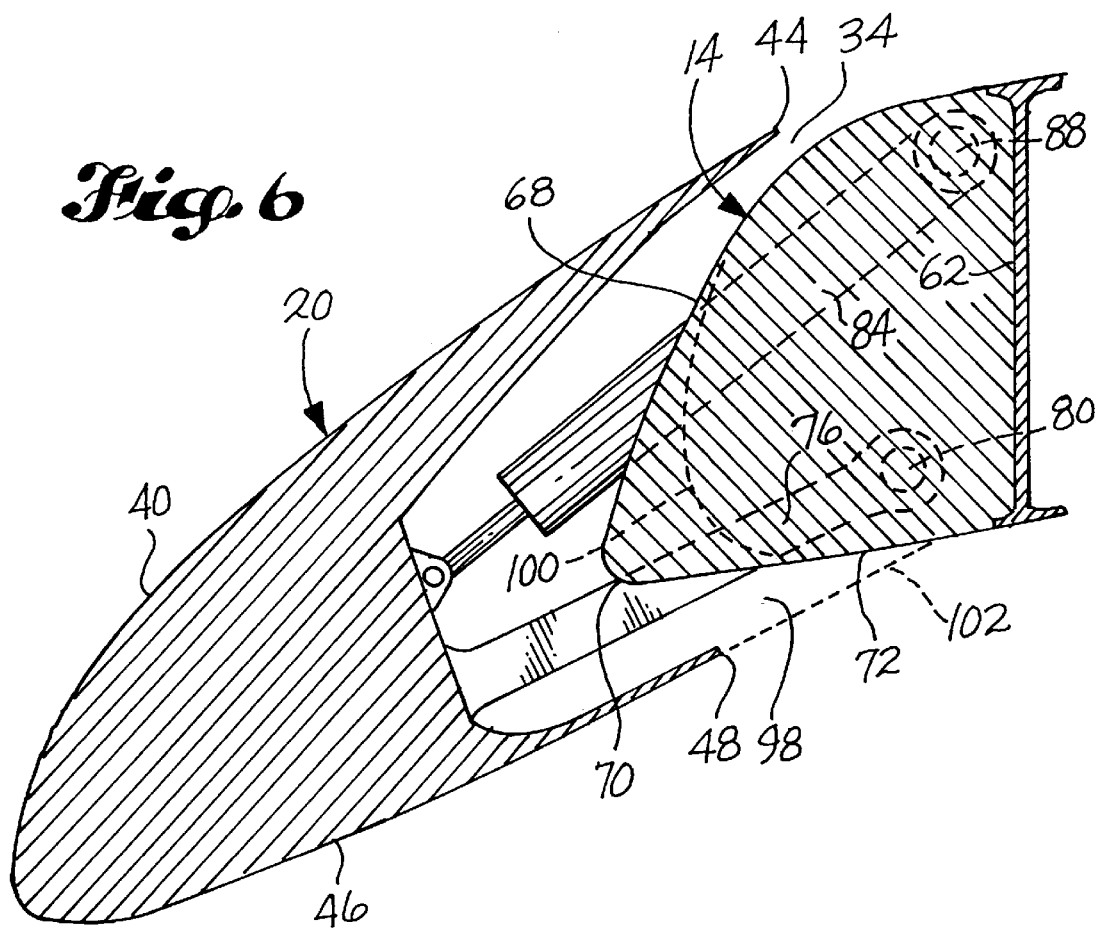

WING LEADING EDGE FLAP AND METHOD THEREFOR

TECHNICAL FIELD

The present invention relates generally to a high lift device for an aircraft, and more particularly to a leading edge high lift device for an airplane wing.

BACKGROUND OF THE INVENTION

The design of a modern military fighter airplane involves the consideration of many important factors. When the design requirements for the fighter airplane include short field and/or vertical takeoff and landing capabilities, many of these factors assume an even greater importance.

For example, maneuverability is critical to a fighter airplane particularly with regard to the airplane's ability to turn quickly and tightly when engaged against an enemy airplane. Often, the airplane which is able to out-turn its opponent is able to successfully fire upon and destroy the opponent airplane. Conventional mechanisms have been used on fighter aircraft to change the wing configuration in order to allow the fighter to turn more rapidly or through a smaller radius.

During aerial combat maneuvering it is not uncommon for the airplane to be flown under high "g" conditions at angles of attack at or near stall. Often, this occurs during high "g" turns when attempting to maneuver into position to fire at an enemy airplane. During these high "g" turns, it is important that the airplane remain stable and under control of the pilot. An airplane which has stalled in an unbalanced condition will sometimes enter a spin. Failure to maintain control can result in the enemy airplane being able to gain an advantageous position to fire on and destroy the out-of-control airplane.

In addition to maximizing aircraft maneuverability, minimizing weight is another key design goal. An aircraft that is lighter generally can accelerate faster. In addition, when the aircraft has a short (or vertical) takeoff and landing requirement, weight reduction is critical to allowing the aircraft to achieve this goal.

Furthermore, systems that are simple generally have fewer parts and weigh less than more complicated systems. A further advantage of employing a mechanically simpler system is greater reliability as well as reduced maintenance. These factors are also important for a military airplane where access to proper maintenance is sometimes limited.

There are a number of conventional high lift devices for wings. For example, in U.S. Pat. No. 2,167,601 by Rose there is disclosed a movable leading edge device for a wing which in an extended position opens a passageway between the wing leading edge and the device to allow air flow from the bottom of the wing to the top of the wing.

In addition, U.S. Pat. No. 4,285,482 by Lewis, and assigned to the assignee of the present invention, pertains to a hinged leading edge high lift device which forms an aerodynamic slot in the extended position. On the other hand, U.S. Pat. No. 4,880,189 by Day pertains to a device for closing a slot which is present in the leading edge of a wing.

Other devices include those disclosed in U.S. Pat. No. 4,585,192 by Clifford-Jones which pertains to a mechanism for extending and retracting a leading edge slat; as well as U.S. Pat. No. 5,158,252 by Sakurai (assigned to the assignee of the present invention) which pertains to a leading edge flap having a variable camber surface; and U.S. Pat. No. 5,056,741 by Bliesner et al (also assigned to the assignee of the present invention) which pertains to a leading edge flap wherein the bluntness of the leading edge portion and the slot-gap width are varied.

Furthermore, U.S. Pat. No. 4,293,110 by Middleton et al (assigned to the assignee of the present invention) pertains to a leading edge flap for a supersonic airplane; and U.S. Pat. No. 3,375,998 by Alvarez-Calderon discloses a leading edge flap which combines the advantages of a Krueger type flap with those of a slotted leading edge flap.

And, French Patent No. 58,868 pertains to a slotted leading edge airfoil.

SUMMARY OF THE INVENTION

The present invention pertains to wing leading edge flap system which includes a wing leading edge and a leading edge flap as well as means, connected to the wing leading edge, for supporting the flap in a manner that the flap is allowed to rotate about a single pivot point relative to the wing leading edge. In addition, the leading edge flap system includes means for rotating the flap between a retracted position and (i) a first extended position where the flap is rotated away from the leading edge a first amount such that there is a first lower gap between the flap lower trailing edge and the wing leading edge lower portion and a second upper gap between the flap upper trailing edge and the wing leading edge upper portion. The first lower gap and second upper gap have sizes that permit only an insignificant air flow to enter the first gap and exit the second gap so as to improve lift at higher airspeeds without incurring large drag increases which can result from a significant air flow out the upper gap.

The leading edge flap system also includes means for rotating the flap between a retracted position and a second extended position where the flap is rotated away from the leading edge a second amount which is greater than the first amount such that there is a third lower gap between the flap lower trailing edge and the wing leading edge lower portion and a fourth upper gap between the flap upper trailing edge and the wing leading edge upper portion. The third lower gap and fourth upper gap have sizes that permit a significant air flow to enter the third gap and exit the fourth gap so as to improve lift and lateral stability at lower airspeeds.

It is an object of the present invention to provide a leading edge flap system which improves the maneuverability and stability of an airplane.

It is another object to provide a leading edge flap system which is simple, compact, and lightweight.

It is another object to provide a leading edge flap system which provides improved low speed stability and maneuvering as well as improved high speed maneuvering.

BRIEF DESCRIPTION OF THE DRAWINGS

These and other objects and advantages of the present invention will be discussed further in the following detailed description in conjunction with the attached drawings, in which:

FIG. 3 is a sectional side view of the leading edge flap system in a first extended position;

FIG. 4 is a side sectional view of the leading edge flap system in a second further extended position;

FIG. 6 is identical to FIG. 4 except for the addition of hidden lines which illustrate an undesirable modification of the leading edge flap system of the present invention.

DETAILED DESCRIPTION

Figure 1:
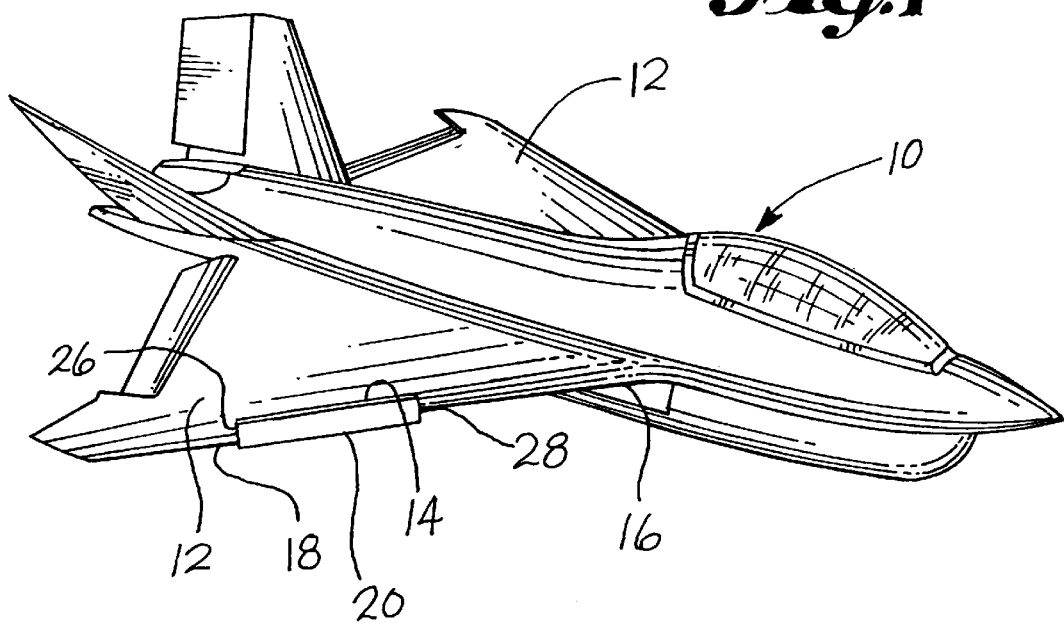
FIG. 1 is a perspective view of an airplane which incorporates an exemplary embodiment of the leading edge flap system of the present invention.

Referring first to FIG. 1 there is shown a fighter airplane indicated at 10 which includes port and starboard wings 12. Each wing includes a fixed leading edge indicated at 14 which has an inboard end identified by the number 16 where the fixed leading edge meets the airplane fuselage and an outboard end identified by the number 18. Extending from each wing fixed leading edge is a novel leading edge flap 20 (only one of which is shown) which has an outboard end 26 located adjacent the leading edge outboard end 18, and an inboard end 28 located adjacent a point about midway between the outboard end 18 and the inboard end 16 of the fixed leading edge.

In the present invention the flap 20 provides improved maneuvering capability and stability at various airspeeds. In order to achieve this, the flap 20 is moveable between (i) a fully retracted position shown in FIG. 2, (ii) an intermediate, high speed maneuvering position shown in FIG. 3 and (iii) a fully extended, low speed maneuvering position shown in FIG. 4.

The intermediate, high speed configuration shown in FIG. 3 is commanded at higher airspeeds, typically at airspeeds of Mach 0.8 or higher. The purpose of this flap configuration is to improve the lift-to-drag ratio of the wing at high angles of attack which are typically achieved during aerial combat maneuvering when the aircraft is turning tightly.

During high speed maneuvering, as the wing is subjected to additional "g" loading caused by the pilot pulling back on the control stick, the flap 20 is extended to the intermediate position (FIG. 3) so as to provide additional camber to the wing. This additional camber improves the lift-to-drag ratio and provides additional usable lift to allow the pilot to apply additional "g" loads to the wing so that the airplane will turn through a smaller radius.

On the other hand, the fully extended configuration shown in FIG. 4 is commanded at lower airspeeds, typically at around Mach 0.2 or less. As discussed previously, during air combat maneuvering situations it is not uncommon for the airplane to be flown at high angles of attack where the airspeed approaches stall. In these situations the airplane 10 can become laterally unstable.

Figure 5A:
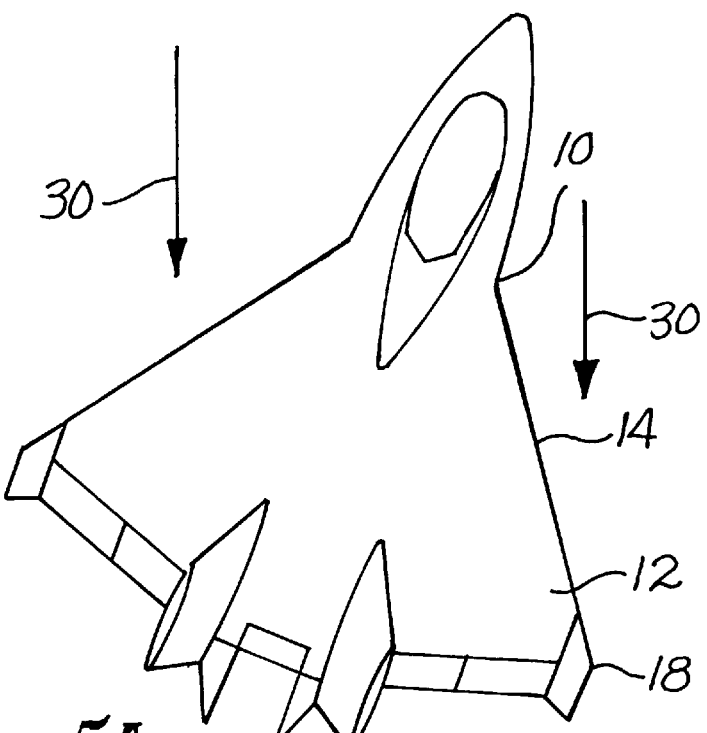
FIG. 5A is a plan view of an airplane in a sideslip condition and FIG. 5B is a plan view of an airplane in balanced flight.
Figure 5B:
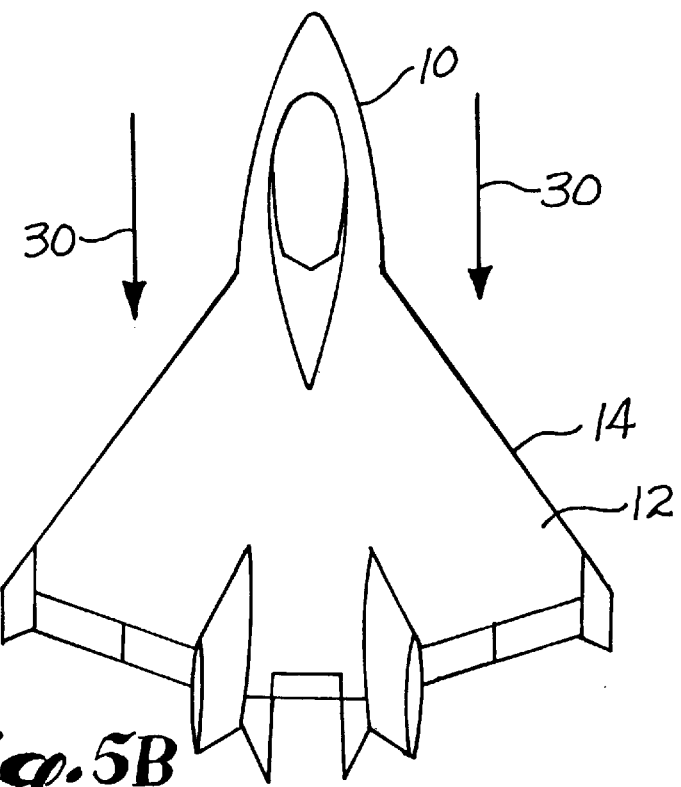

For example, during air-to-air combat the aircraft may enter a sideslip condition as shown in FIG. 5A. In this situation where the airplane 10 is in a left sideslip, the relative wind, as designated by the arrows 30, intersects the port wing leading edge at a different angle than the starboard wing leading edge. Normally, when the airplane is in balanced flight (FIG. 5B), the relative wind intersects the port and starboard wing leading edges at the same angle. However, during stall, the sideslip condition shown in FIG. 5A can result in the port wing stalling first and producing less lift than the starboard wing, thereby causing the airplane to roll unstable into the sideslip. This is especially true when the airplane wings are highly swept, such as the airplane 10, which has a wing leading edge sweep back of greater than fifty degrees.

In order to delay the onset of stall and avoid the undesirable consequences of the aforementioned windward wing rolloff at sideslip, in the present invention when approaching stall, the flaps 20 are extended to the position shown in FIG. 4. When each flap 20 is in this extended position, a slot 34 is formed which allows high energy air, flowing along the bottom of the flap, to flow upward (shown by an arrow 36) through the slot and over the top of the fixed leading edge. In this manner, separation of the airflow along the upper surface of the wing is diminished, and in particular, with respect to the windward wing, stall is delayed until higher angles of attack are reached.

In addition, the increased camber of the airfoil resulting from the extension of the flap 20 in response to increasing g forces, minimizes the drag buildup over the wing. This improves the lift-to-drag ratio and provides additional lift to allow the pilot apply additional "g" loads to the wing so that the airplane will turn faster and through a smaller radius.

Having described the purposes and functions of the leading edge flap system of the present invention, attention now will be turned to the details of its configuration. As shown in FIG. 3, the flap 20 has a conventionally cambered upper surface 40 which terminates at its forward end at a convex leading edge portion 42 and which terminates at its rear end at an upper trailing edge 44. The flap 20 includes a conventional lower surface 46 which terminates at a lower trailing edge 48.

The rear surface of the flap 20 has a conventional configuration which includes an upper rear surface 52 which extends downward and forward from the upper trailing edge 44 where it joins with an intermediate surface 54 which extends downward, and which in turn joins with a lower rear surface 56. The lower rear surface 56 extends downward and rearward and then further rearward where it terminates at the lower trailing edge 48 of the flap.

Located behind the flap 20 is the wing 12 which includes the fixed leading edge portion 14 which is defined as the entire fixed portion of the wing forward of a front spar 62. The leading edge portion 14 includes an upper surface 64 which extends forward from the front spar 62 and intersects with an upper convex corner surface 66. Extending forward and downward from the corner surface 66 is a leading edge surface 68 which terminates at a convex nose portion 70 near the bottom of the leading edge. The bottom of the nose portion 70 extends rearward where it joins with a bottom surface 72 of the fixed leading edge.

In an exemplary embodiment shown in FIG. 3, the flap 20 is supported from the wing 12 by two linear support arms 76 (only one of which is shown), each having a forward end 78 which is fixedly mounted to the flap 20 and a rear end which is connected to the wing in a conventional manner by a pivot connector 80. In order to extend and retract the flap 20, one or more conventional linear actuators 84 are used. Each actuator 84 includes a forward end 86 which is pivotally connected to the flap 20 and a rear end which is connected to the wing 12 in a conventional manner by a pivot connector 88. It should be appreciated that other conventional mechanisms (not shown) can be used to support as well as to extend and retract the flap 20.

The flap 20 is extended by the linear actuator 84 and is caused to rotate in a counterclockwise direction (when viewing FIG. 3) about the pivot connector 80. In an exemplary embodiment, the flap 20 rotates about ten degrees to reach the intermediate maneuvering position shown in FIG. 3.

In order to achieve the high speed maneuvering capabilities discussed earlier with reference to the configuration shown in FIG. 3, it is desirable that the trailing edge 44 of the flap upper surface be located as close to the corner portion surface 66 as possible in order to minimize any air flow between edge 44 and corner 66. Preferably, there is no gap between the trailing edge 44 and corner 66. It is believed that substantial slot flow at high Mach numbers can degrade the lift/drag ratio. However, it has been found that a small gap on the order of about 0.2 inches or less is acceptable since air flow through such a slot is relatively insignificant.

Movement of the flap 20 to the fully extended maneuvering position shown in FIG. 4 is accomplished by further extension of the linear actuator 84 and rotation (counterclockwise) of the flap 20. In an exemplary embodiment, flap 20 is rotated an additional ten degrees from the intermediate maneuvering position, or a total of twenty degrees from the retracted position (shown in FIG. 2), to reach the fully extended maneuvering position.

Figure 2:
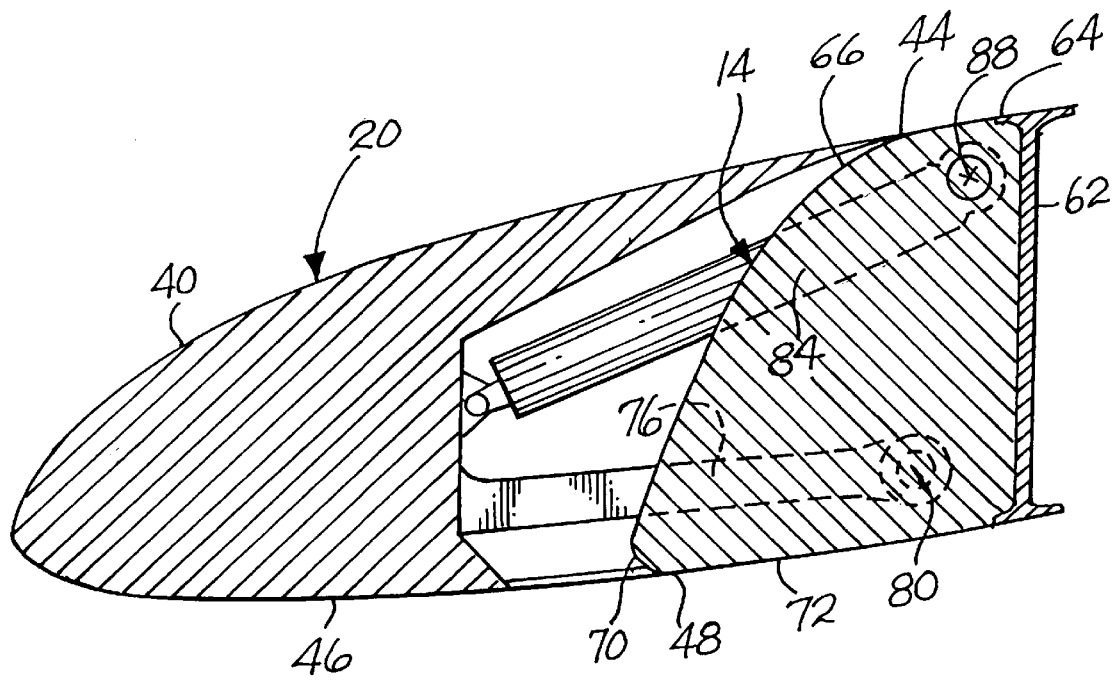
FIG. 2 is a sectional side view of the leading edge flap system in a fully retracted position.

As shown in FIG. 2, when the flap 20 is in the retracted position, the flap lower trailing edge 48 engages the bottom part of the leading edge nose 70, and the lower surface 46 of the flap is aligned with the lower surface 72 of the leading edge 14 forming the desired aerodynamic outer contour of the wing. At the same time, the flap upper trailing edge 44 engages the top part of the leading edge corner portion 66, and the upper surface 40 of the flap 20 is aligned with the upper surface 64 of the fixed leading edge.

In order to achieve the low speed stability capabilities discussed earlier, when the flap 20 is in the low speed maneuvering position shown in FIG. 4, it is desirable that the upper trailing edge 44 of the flap be spaced apart from the leading edge corner 66 to form the discharge slot 34 therebetween. As discussed earlier, to obtain low speed stability it is desirable that a portion of the air along the bottom surface 46 of the flap be discharged through the slot 34 and over the upper surface 64 of the fixed leading edge 14.

However, in order to obtain the desired air flow characteristics through the discharge slot 34, an airflow space (hereinafter referred to as a "cove gap") 96 (FIG. 4) between the rear surface of the flap and the surface of the fixed leading edge is configured in a particular manner. More specifically, an air entry gap 98 is formed between the flap lower surface trailing edge 48 and the lower surface 72 of the fixed leading edge. Once the air flows through the entry gap 98 and proceeds toward the discharge slot 34, the cove gap 96 generally converges and is referred to as a "simply convergent cove gap". This is accomplished by the configuration of the fixed leading edge 14 in combination with the configuration of the rear surface of the flap, together with the location of the pivot connector 80.

The purpose of having a simply convergent cove gap 96 is to produce the most efficient air flow through the cove gap to generate a maximum air flow discharge velocity exiting the upper air flow slot 34. This would not be the case if the cove gap were configured such that the air accelerated and decelerated inside the cove gap. By having a simply convergent configuration the air flow continues to accelerate through the gap. In this manner, the energy of the air exiting the slot 34 and flowing over the upper surface of the wing is maximized so as to delay air flow separation and thereby maximize lift.

More precisely, the entry gap 98 is larger than the discharge slot 34 and is typically in the ratio of two to one in size. Furthermore, the radius of the nose 70 is relatively small since the low velocity of the air flow as it starts to enter the cove gap is able to negotiate the small radius. As seen in FIG. 4, the space between the lower nose 70 and the flap rear lower surface 56 forms approximately the widest portion of the cove gap 96. Narrowing of the cove gap 96 begins to occur at the portion of the gap 96 defined by the leading edge surface 68 and the flap rear surface 54. Further narrowing occurs at the portion of the gap 96 defined by the flap rear surface 52 and the leading edge surface 68.

The position of the flap 20 relative to the leading edge 14 and the configuration of the cove gap 96 is also a function of the location of the flap hinge point (pivot connector 80) in the lower third of the leading edge and forward of the forward spar 62. For example, if the flap hinge point is located too high inside the leading edge 14, there would be an insignificantly small discharge gap 34 when the flap was rotated to the fully extended position.

In addition, the relatively larger radius (about four to six times larger than the radius of nose 70) of the leading edge upper corner 66 allows air flow through the cove gap 96 to flow along this corner 66 to the upper surface 64 of the leading edge. If the radius of corner 66 were too small, the discharging air might not flow smoothly around this corner resulting in separation of the air flow from the leading edge and poor high lift and stability performance.

As discussed above, the leading edge nose 70 has a relatively small radius. If this corner were more rounded as in conventional leading edges, then a longer flap trailing edge 48 would be required to seal the lower surface of the wing when the flap is in the retracted position. This undesirable situation can be explained by reference to FIG. 6 where a conventional leading edge 100 is shown by dashed lines. With this configuration, when the flap 20 was fully retracted, in order to seal the lower surface of the wing, the lower trailing edge 48 of the wing would have to be lengthened in a rearward direction as shown by the dashed lines identified by the number 102. However, as shown in FIG. 6, this lengthened trailing edge 102 would also seal the entry gap 98 preventing air from flowing through the cove gap 96 and out the discharge slot 34. This problem is overcome by the design of the present invention.

On the other hand, if leading edge nose 70 were lengthened too far forward (not shown), then instead of cove gap 96 simply converging, it would first converge then diverge. This would result in degradation of the flap's high lift properties at low airspeeds.

As shown in FIG. 6 the flap 20 is hinged at the pivot connector 80. Conventional leading edge slats and flaps utilize Fowler motion to obtain the desired high lift effects. That is, typically, these conventional flaps do not simply rotate about a single hinge point relative to the leading edge as in the present invention. Rather, conventionally the flap is moved forward from the fixed leading edge while being rotated. This typically requires a number of tracks to support the flap while it is moved forward relative to the leading edge.

However, tracks add weight to the system which is unacceptable. In the present invention, the unique configuration of the leading edge in combination with the rotation of the flap about a single pivot point achieves the required maneuvering and stability requirements without the need for the additional complexity and weight of a track system.

In an exemplary embodiment, the position of the flap 20 is automatically controlled by a computer in a conventional manner as a function of "g" load and airspeed. For example, at speeds of Mach 0.2 or lower, the maximum deflection would be twenty degrees. However, the position of the flap between zero and twenty degrees would be a function of "g" loading with greater flap deflection being commanded as a function of increased "g" loading. Similarly, at speeds of Mach 0.8 or higher, the maximum deflection would be ten degrees. However, the position of the flap between zero and ten degrees would also be a function of "g" loading, i.e. greater deflection commanded as a result of greater "g" loading.

What is claimed is:

1. A leading edge flap system for a wing, the flap system comprising:
   a. a wing leading edge having an upper corner surface and a lower nose surface;
   b. a flap having an upper trailing edge and a lower trailing edge that has a rearward extending portion with a rearward dimension;
   c. means, connected to the wing, for supporting the flap from the wing leading edge in a manner that the flap is allowed to rotate relative to the wing leading edge;
   d. means, connected to the wing, for rotating the flap relative to the wing leading edge between (i) a retracted position where the rearward extending portion of the flap lower trailing edge is located adjacent to the lower nose surface of the wing leading edge so as to prevent a flow of air therebetween, and (ii) an extended position such that there is a first gap between the rearward extending portion of the flap lower trailing edge and the wing leading edge lower nose surface and a second gap between the flap upper trailing edge and the wing leading edge upper corner surface wherein the first and second gaps have sizes that permit a flow of air to enter the first gap and exit the second gap; and
   e. the wing leading edge being further characterized by the upper corner surface having a radius that is between about four and about six times larger than a radius of the lower nose surface so that the lower nose surface projects sufficiently forward in order to minimize the rearward dimension of the flap lower trailing edge rearward extending portion for preventing the flow of air in the retracted position.

2. The wing leading edge flap system as set forth in claim 1 wherein the flap rotating means includes an extension mechanism for rotating the flap between the retracted position, an intermediate position when the wing is operating at higher airspeeds and at higher angles of attack such that the flap is rotated relative to the wing leading edge a first amount, and the extended position for improving lift at lower airspeeds and higher angles of attack where the flap is rotated relative to the wing leading edge a second amount that is greater than the first amount.

3. The flap system as set forth in claim 2 wherein the extension mechanism operates to rotate the flap to the intermediate position when the wing is operating at airspeeds of Mach 0.8 and higher, and to the extended position when the wing is operating at airspeeds of Mach 0.2 and lower.

4. The flap system as set forth in claim 2 wherein the extension mechanism operates to rotate the flap to the intermediate position when the wing is operating at airspeeds of Mach 0.8 and higher, and the higher angles of attack are near a stall angle of attack, and to the extended position when the wing is operating at airspeeds of Mach 0.2 and lower, and the higher angles of attack are near a stall angle of attack.

5. The flap system as set forth in claim 2 wherein the extension mechanism operates to rotate the flap in a manner that when the flap is at the intermediate position the flap upper trailing edge is located at a position adjacent to the wing leading edge upper corner surface so as to minimize any air flow between the wing leading edge upper corner surface and the flap upper trailing edge.

6. The flap system as set forth in claim 2 wherein the extension mechanism operates to rotate the flap about a single pivot axis inside the wing when the flap is moved between the retracted position, the intermediate position and the extended position.

7. The flap system as set forth in claim 2 wherein the extension mechanism operates to move the flap automatically between the retracted position, the intermediate position and the extended position.

8. The flap system as set forth in claim 2 wherein:
   a. the flap includes a rear surface which extends between the flap upper trailing edge and the flap lower trailing edge;
   b. the wing leading edge includes a front surface extending between the leading edge upper corner surface and the leading edge nose surface; and
   c. the extension mechanism operates to rotate the flap between the retracted position and the intermediate position in a manner that a distance between the flap rear surface and the wing leading edge front surface decreases when proceeding from the leading edge lower nose surface to the leading edge upper corner surface so as to cause the air to accelerate through the second gap.

9. A method of operating a flap from a wing of an airplane having a wing leading edge with an upper corner surface and a lower nose surface, the method comprising the steps of:
   a. supporting the flap from the wing in a manner that the flap is allowed to rotate relative to the wing leading edge, the flap having an upper trailing edge and a lower trailing edge that has a rearward extending portion with a rearward dimension; and
   b. rotating the flap relative to the wing leading edge between (i) a retracted position where the rearward extending portion of the flap lower trailing edge is located adjacent to the lower nose surface of the wing leading edge so as to prevent a flow of air therebetween wherein the upper corner surface has a radius that is between about four and about six times larger than a radius of the lower nose surface so that the lower nose surface projects sufficiently forward in order to minimize the rearward dimension of the flap lower trailing edge rearward extending portion for preventing the flow of air in the retracted position, and (ii) an extended position such that there is a first gap between the rearward extending portion of the flap lower trailing edge and the wing leading edge lower nose surface and a second gap between the flap upper trailing edge and the wing leading edge upper corner surface wherein the first and second gaps have sizes that permit a flow of air to enter the first gap and exit the second gap.

* * * * *